United States Patent
Husgafvel et al.

(10) Patent No.: US 7,170,497 B2
(45) Date of Patent: Jan. 30, 2007

(54) ELECTRONIC DEVICE AND CONTROL ELEMENT

(75) Inventors: Ilkka Husgafvel, Helsinki (FI); Panu Johansson, Fredriksberg (DK)

(73) Assignee: Nokia Corporation, Espoo (FI)

( * ) Notice: Subject to any disclaimer, the term of this patent is extended or adjusted under 35 U.S.C. 154(b) by 363 days.

(21) Appl. No.: 10/322,147

(22) Filed: Dec. 18, 2002

(65) Prior Publication Data

US 2003/0135292 A1    Jul. 17, 2003

(30) Foreign Application Priority Data

Dec. 31, 2001    (FI) .................................. 20012610

(51) Int. Cl.
*G09G 5/00* (2006.01)
*G09G 5/08* (2006.01)
*G06F 3/00* (2006.01)
*G06F 9/00* (2006.01)
*G06F 17/00* (2006.01)

(52) U.S. Cl. ........................ 345/172; 345/160; 715/830

(58) Field of Classification Search ........ 345/156–158, 345/160, 162, 168–170, 172, 173, 184, 684–688; 715/784–787, 828–834, 854–859, 973, 974; 273/148 B
See application file for complete search history.

(56) References Cited

U.S. PATENT DOCUMENTS

| | | | | |
|---|---|---|---|---|
| 5,191,320 A | * | 3/1993 | MacKay | ...................... 345/184 |
| 5,436,954 A | | 7/1995 | Nishiyama et al. | ............ 379/58 |
| 5,670,955 A | * | 9/1997 | Thorne et al. | ................. 341/34 |
| 5,706,448 A | | 1/1998 | Blades | ........................ 395/326 |
| 5,808,602 A | * | 9/1998 | Sellers | ........................ 345/157 |
| 5,877,463 A | * | 3/1999 | Choi | ............................. 200/4 |
| 5,915,228 A | * | 6/1999 | Kunihiro et al. | .......... 455/575.1 |
| 6,034,688 A | * | 3/2000 | Greenwood et al. | ........ 715/784 |
| 6,292,562 B1 | * | 9/2001 | Badarneh | ............... 379/433.07 |
| 6,483,500 B1 | * | 11/2002 | Choi et al. | ................... 345/184 |
| 6,636,197 B1 | * | 10/2003 | Goldenberg et al. | ......... 345/156 |
| 6,809,661 B1 | * | 10/2004 | Badarneh | ...................... 341/31 |
| 2001/0048425 A1 | | 12/2001 | Partridge | .................... 345/161 |

FOREIGN PATENT DOCUMENTS

| | | |
|---|---|---|
| DE | 19743283 C1 | 2/1999 |
| EP | 0715441 A1 | 6/1996 |
| EP | 0463856 B1 | 1/1997 |

(Continued)

*Primary Examiner*—Bipin Shalwala
*Assistant Examiner*—Jeff Piziali
(74) *Attorney, Agent, or Firm*—Harrington & Smith, LLP

(57) ABSTRACT

An electronic device (1) comprises a control element (6) for receiving user input, and the control element (6) comprises at least a first input means (6*b*), a second input means (6*c*) and a protective cover (2) with a specified place for the control element (6). The first input means (6*b*) is essentially plane-shaped and the second input means (6*c*) is essentially ring-shaped; the control element (6) has a first input mode and a second input mode; in the first input mode, the control element (6) is arranged to receive input in the form of navigation information; and in the second input mode, the control element (6) is arranged to receive input in the form of alphanumeric information. The device (1) is arranged to be controlled by means of information received by the control element (6).

14 Claims, 6 Drawing Sheets

FOREIGN PATENT DOCUMENTS

| | | |
|---|---|---|
| EP | 0755142 A2 | 1/1997 |
| EP | 0802658 A2 | 10/1997 |
| GB | 2355144 A | 4/2001 |
| WO | WO-01/41402 A3 | 6/2001 |
| WO | WO 01/41402 A3 * | 6/2001 |

* cited by examiner

ELECTRONIC DEVICE AND CONTROL ELEMENT

FIELD OF THE INVENTION

This invention relates to an electronic device, particularly but not necessarily to the user interface of a portable electronic device and an associated control element.

BACKGROUND OF THE INVENTION

A number of prior art electronic devices for better mobility of people are available; these include wireless communications devices. One type of wireless communications device is a mobile telephone, such as a digital mobile telephone according to the GSM (Global System for Mobile Communications) standard, operating in a mobile communications system based on cellular network technology.

Electronic devices for storing various kinds of information are known to be available; these include devices such as notebook computers, miniature handheld computers and PDA devices (Personal Digital Assistant). These devices can be used for storing calendar information, notes, address information, phone numbers or other such information entered by the user. The information can be viewed on the display of the device. Information is usually entered into the devices by means of a keyboard, but devices equipped with a touch-sensitive display are also known to be available.

The features of wireless communications devices, such as mobile phones, are constantly increasing and usually comprise functions for storing the telephone numbers of people and companies, for example. Known devices include the Nokia® 8210, 7110 and 6110 mobile phones. Devices with a combination of two user interfaces are also known to be available; these may include, for example, the user interfaces of a mobile phone and a PDA device. One such known device is the Nokia® Communicator 9210. The first user interface, that is, the PDA user interface, can be used for storing various kinds of information in the device, establishing a wireless connection to the Internet and receiving fax messages, for example. The second user interface, that is, the CMT (Cellular Mobile Telephone) user interface can be used for traditional mobile phone functions such as receiving calls and dialing telephone numbers. The communicator described above comprises separate keypads and displays for the two user interfaces, so that the PDA user interface is arranged for use in the open position of the device and the CMT user interface is arranged for use in the closed position of the device.

The electronic devices in question usually include a display where the user can see the information entered on the keypad or keyboard and where the user can view other information such as received messages, instructions or other information. The technological development of electronics and batteries has made it possible to manufacture smaller and smaller devices with an ever-increasing number and variety of functions. This improvement in functionality makes the interaction between users and electronic devices more versatile, which has led to the availability of several menu options for accessing the various functions. Accordingly, electronic devices generally require a relatively large display and a number of keys for input. It is now common that users carry electronic devices with them most of the time. Increased mobility in general limits the dimensions of electronic devices to handheld size. The devices must also be of rugged construction, as they are carried around a lot.

In order to keep the size of the electronic device small, browsing menus have been created where the number of choices and/or information available at any particular time is small and the size of the keys on the keypad has been reduced.

In the context of wireless communications devices, a variety of control elements for controlling the functions of the devices are known. These control elements include, for example, one or more keys situated next to the display; in this case, the key press selects the control function indicated by the function command or associated symbol shown on the display near the key. The keypad usually includes keys for moving the cursor up and down on the display, and often includes keys for moving left and right. For this purpose, the keypad may include a single pivoting key or button for selecting the direction of the cursor.

The control element known from the patent publication EP 0 463 856 B1 is a rotating control roller or control ball placed in the front panel of a mobile phone for browsing the menu functions in a menu structure, for example. A cylindrical control roller rotating around its longitudinal axis, used for browsing the menu functions in a menu structure, can also be located with the hinge in a collapsible mobile phone, essentially parallel to the hinge and on the same axis as the hinge as illustrated in publication EP 0 715 441 A1. In this case, a separate control button may be located close to the control roller for selecting and activating a menu function chosen from the menu using the control roller. It is also known from publication U.S. Pat. No. 5,436,954 that a control roller located in the hinge may be moved at least a short distance in the direction of its longitudinal axis, so it can be used for moving a cursor shown on the display. A control lever, control pin or similar joystick-type device can also be adapted for a mobile phone to provide cursor control functions similar to a control ball.

A control element known from the context of mobile phones is a rotating disc-type control roller presented in patent publication EP 0 755 142 A2. The user can navigate a telephone book presented on the mobile phone display by rotating the roller and select the desired phone number by pressing the roller. The control roller can also be used for forming a string of alphanumeric characters for the telephone book, for example. In this case, rotating the control roller in its two different directions will change the character presented on the display either to the next or previous character in alphabetical order, and the character to be appended to the string can be selected by pressing the control roller. This is accomplished by means of control roller movement towards the device, activating a switch located in connection with the control roller. The case of the character can be changed by holding the control roller down.

As the size of the known devices presented above is decreasing, particularly in the case of wireless communications devices, the large number of control elements to be placed on the device and their placement poses a problem particularly from the viewpoint of ergonomics and ease of use. A particular problem is that as the number of functions in wireless communications devices and the variety of available choices is increasing, there is a need to add various kinds of control elements. As the size and weight of the devices is decreasing, the size of the control elements must also be reduced, which will further impair usability. The fact that the applications supported by the devices often require a larger and larger display poses an additional usability problem. It is contradictory that on the one hand, a large display and keypad are required for ease of use, and on the other hand, a portable electronic device must be as small and lightweight as possible.

As the number of different modes and functions of wireless communications devices is increasing, the use of various kinds of menu structures will also increase and the menu structures will become more complex. A particular problem present in prior art devices is navigation in the menu structure. The menu structure usually comprises menu functions associated with each other horizontally and vertically. The menu structure can be navigated in the horizontal direction by moving the cursor, for example by rotating a control roller. The menu function is selected by pressing a control button that may be located in connection with the control roller described above. This will activate another menu function on a higher level. Prior art solutions have also used cursor keys (up, down, left, right), as well as a pivoting navigation key that will activate a user interface control signal corresponding to navigation in the various directions when pressed at different points.

In addition to navigating the menu structures as described above, the user interface (UI) of an electronic device must provide the user with the possibility of entering normal alphanumeric information. For this purpose, known electronic devices, such as typical wireless communications devices, include a number keypad with the figures 0 to 9, the characters * and #, as well as a number of other keys required for operating the phone.

The object of the present invention is to provide an improvement to prior art and improve the usability of electronic devices. A particular aim of the invention is to diversify the possibilities of using control elements. In addition to this, the aim of the invention is to enable the user interface control elements and the keypad to be implemented in a smaller space, allowing the vacated space to be used for other parts of the user interface in the electronic device.

SUMMARY OF THE INVENTION

According to a first aspect of the invention, an electronic device is implemented that comprises a control element for receiving input from the user; said control element comprises at least a first input means and a second input means, a protective cover with a specified place for the control element, characterised in that the first input means is a multi-function input means and the second input means is essentially a ring-shaped input means rotatable in a plane, and said control element has a first input mode and a second input mode; in the first input mode, the control element is arranged to provide the device with navigation information in response to at least one of the following actions:

operation of the first input means operation of the second input means; and in the second input mode, the control element is arranged to provide the device with alphanumeric information in response to at least one of the following actions:

operation of the first input means operation of the second input means.

According to a second aspect of the invention, a method for operating an electronic device is implemented; in the method, a control element is used in the electronic device for providing input; the control element comprises at least a first input means and a second input means, characterised in that to use the device, the first, multi-function, input means is activated and the second, essentially ring-shaped, input means is rotated in a plane, and that the control element is arranged to operate in a first input mode where the device is provided with navigation information in response to at least one of the following actions:

operation of the first input means operation of the second input means, and the control element is arranged to operate in a second input mode where the device is provided with alphanumeric information in response to at least one of the following actions:

operation of the first input means operation of the second input means.

According to a third aspect of the invention, a control element for an electronic device is implemented, the device comprising at least one protective cover for adapting the control element and the control element comprising at least a first input means and a second input means, characterised in that the first input means is a multi-function input means and the second input means is essentially a ring-shaped input means rotatable in a plane, and said control element has a first input mode and a second input mode; in the first input mode, the control element is arranged to receive input in the form of navigation information; and in the second input mode, the control element is arranged to receive input in the form of alphanumeric information.

The control element according to the invention for an electronic device enables the same control element to be used for navigating the menu structures of the device, for activating a cursor shown on the user interface display, and for conveying alphanumeric information from the user to the device. Hereinafter, the concept of navigation shall refer to moving in menu structures, as described above, or moving and/or activating a cursor or equivalent in the user interface.

The invention utilises a single control element in a first mode for conveying navigation information from the user to the device and in a second mode for conveying alphanumeric information from the user to the device. A switch element is arranged in the control element or in functional connection with it; using the switch element, the modes of the control element can be changed by the user or by software in the device. The switch element is preferably located with the control element so that it can be operated without essentially changing the grip on the device. In addition to easy change of mode, the ring-like shape of the switch element and the placement of the switch element around the control component of the control element enables the ring-shaped element to be used in connection with the control component for generating various control sequences for the device. A ring-shaped switch element can also be used for implementing status information presented to the user, such as navigation directions and alphanumeric characters.

The invention is suitable for devices where the object is to enable extensive control of functions using a single grip on the device and a small number of control elements. A particular advantage of said single grip is, for example, that the device can be controlled using a single finger in a single position. An advantage of the invention is that the need for control elements is also reduced, which facilitates the placement of control elements. In this case, the need for several separate control elements is reduced and, at the same time, the space taken by control elements is reduced. Contrary to prior art described above, no separate control elements are required for navigation information and alphanumeric information. Both types of information can be conveyed from the user to the electronic device using the multi-purpose control element according to the invention.

An additional advantage of the invention is that by means of the control element, a number of alternative movements deflecting the control element can be used for controlling the device; these include pressing, moving, touching or rotating in different directions.

A particular advantage of using said alternative movements is that in addition to controlling other functions of the wireless communications device, the user will be able to quickly navigate in the menu structure, activate and cancel menu functions etc. According to an embodiment of the invention, the keypad can be abandoned altogether and the device, preferably a mobile phone, can be controlled using a single control element according to the invention.

The control element according to the invention can be used particularly for changing, browsing and selecting menu functions. By means of the invention, particularly movement to an upper level and back to a lower level in the menu structure can be arranged in a flexible manner. The control element can be used for controlling the generation of alphanumeric strings and navigation in the menus. In addition to this, depending on the application or menu structure in use, the user can select from different operation sequences or control element parts the one that is best suited for the purpose or most comfortable for the user.

The invention is also well-suited for devices where a wireless communications device functioning as a mobile phone, for example, is divided into two or more parts, including a so-called cover part, a part fastened on the user's waist comprising an antenna, power supply and RF section, a part fastened on the user's wrist comprising a keypad and display, and a headphone part. The parts communicate with each other to control the operation and convey information. The part located on the wrist is small in size, and in this case, the invention can be used for reducing the number of control buttons on the keypad or for improving the usability of the device. In a preferred embodiment, the keypad in the wrist-mounted part is entirely replaced by a single control element according to the invention. It is obvious that the control element can also be located in the waist-mounted part or alternatively a part placed in a pocket.

In an embodiment of the invention, the control element is formed from a separate control component and a switch element, both comprising a normal position and separate additional positions where they can be pressed down or rotated. The inclusion of an element with two separate control elements in a multi-purpose control element will increase the possibilities of using the control element and the usability of the device using different operation sequences, as the control element may control different functions in the additional positions.

In the following, the invention will be discussed in more detail by the example of a wireless communications device according to a preferred embodiment. The invention can also be applied to other devices within the framework of the enclosed claims. A mobile phone comprising a CMT user interface, a PDA device, a combination of these (communicator), a portable computer or equivalent shall be expressly mentioned. The description makes reference to the enclosed drawings, where:

DETAILED DESCRIPTION

Figure 1:
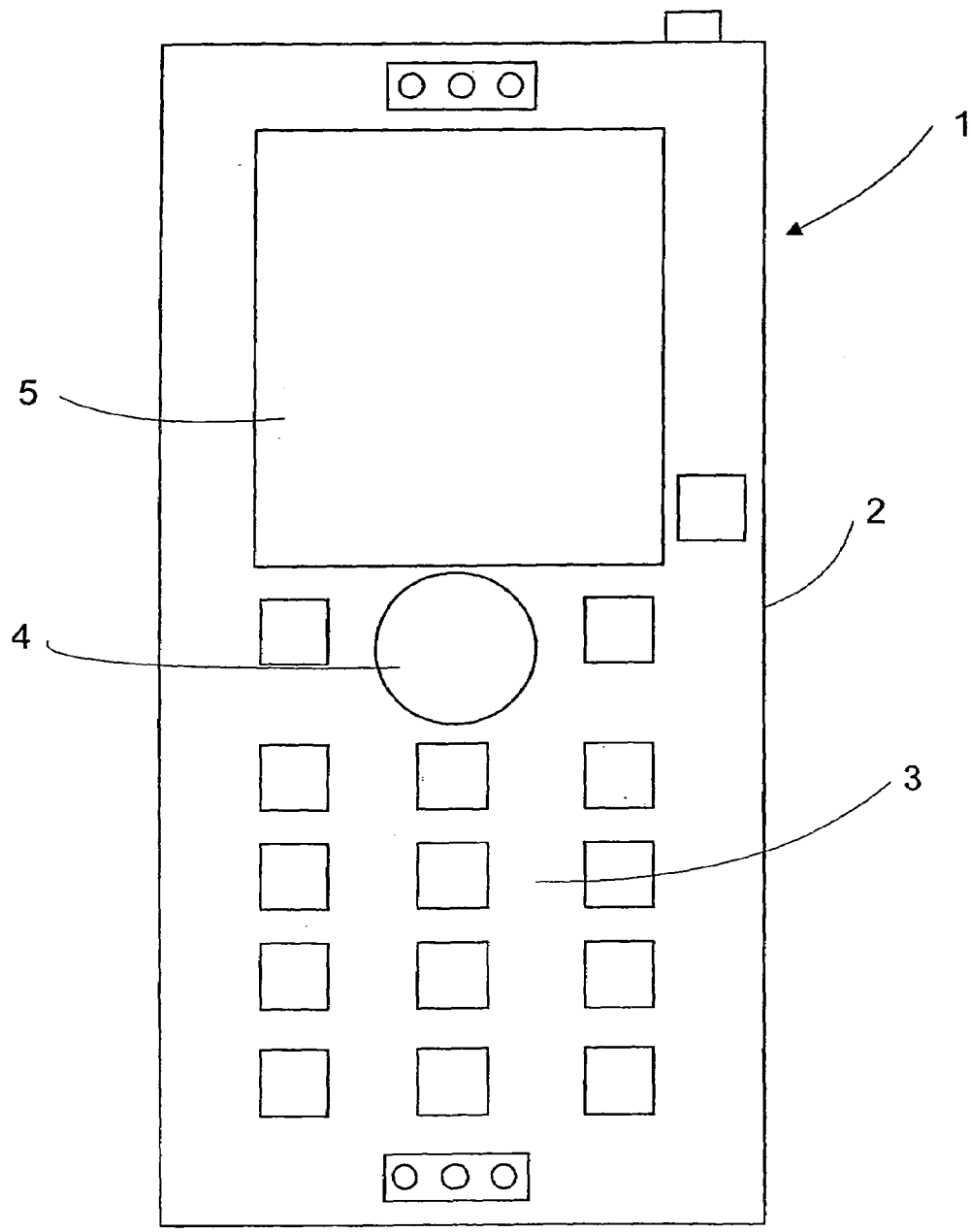
FIG. 1 illustrates a prior art electronic device with separate control elements for navigation information and alphanumeric information.

With reference to FIG. 1, a prior art mobile telephone 1 comprises a cover part 2. The device 1 also comprises first input means 3, second input means 4 and display means 5 for an user interface (UI). The keypad part may be replaced entirely or in part with a touch-sensitive display. A handheld electronic device is also known where the user interface may comprise several display parts 5, for example, or only a touch-sensitive display.

Figure 2:
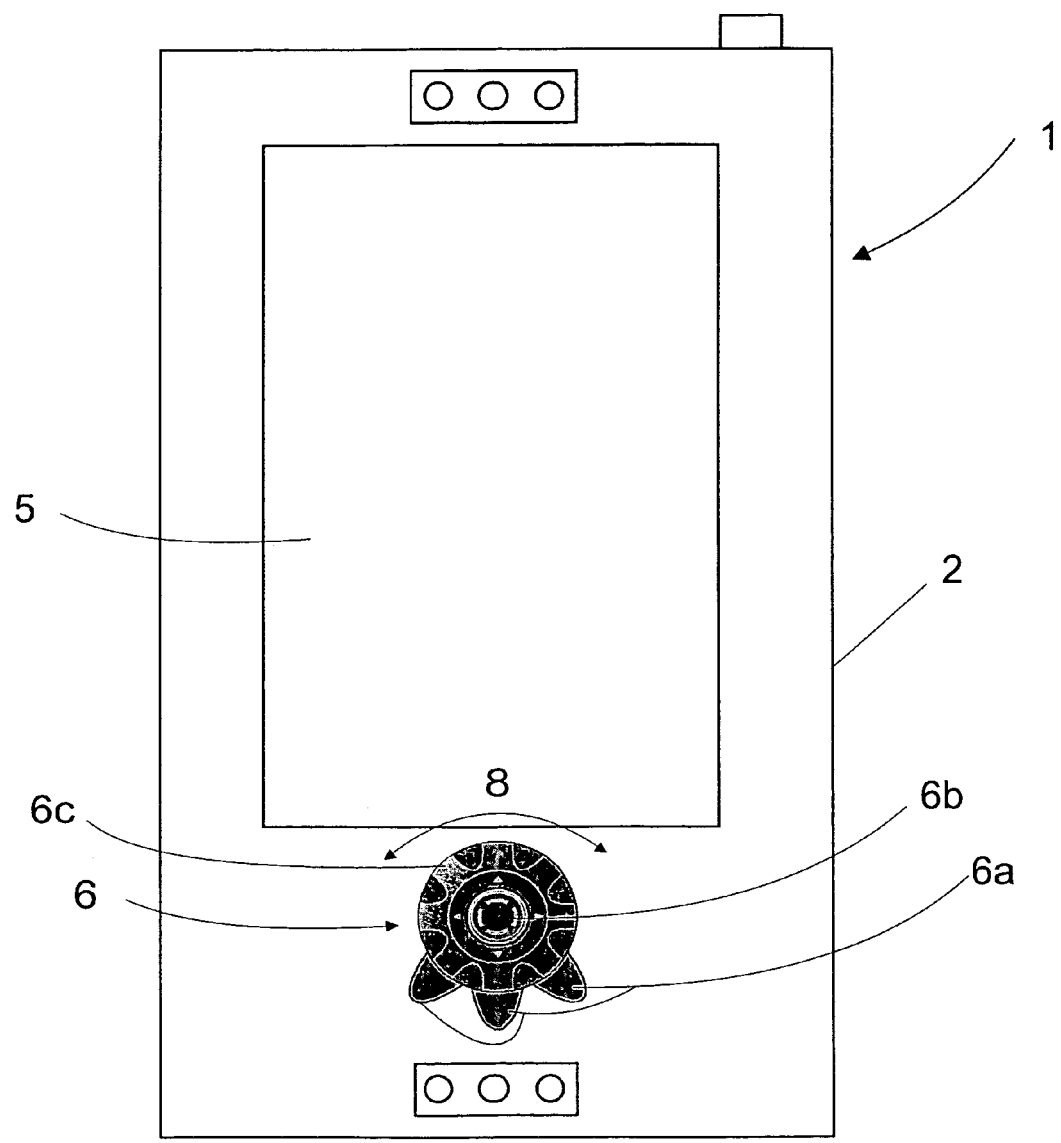
FIG. 2 illustrates a device according to a first preferred embodiment of the invention in the closed position and presented as a perspective drawing.

With reference to FIG. 2, the input and display means for the user interface in a wireless communications device 1 according to a preferred embodiment of the invention comprise a keypad part 6a and a display part 5 located on the surface of a cover part 2. With further reference to FIG. 2, the device 1 also comprises a control element 6 arranged in connection with the cover part 2. The control element 6 comprises, for example, a multi-position pivoting control component 6b intended to be pressed with a finger. In FIG. 2, the control element 6 is located in the place of the keypad part 3 of the device's user interface (compare to FIG. 1), essentially below the display part 5 of the device, where it can be operated using a thumb, for example, when holding the device 1 on one's palm between the thumb and the fingers. The control element 6 according to the invention may naturally be located elsewhere in the cover part 2 of the device. Another alternative for the placement of the control element 6 according to the invention is the side cover of the device, where the control element 6 may be operated in a natural manner when holding the device on one's palm (for example, on the side pointed by the arrow in reference 1). A third alternative for the placement of the control element 6 according to the invention is the back cover of the device, where the control element 6 may be operated while viewing the display part 5 located in the front cover of the device.

Figure 3A:
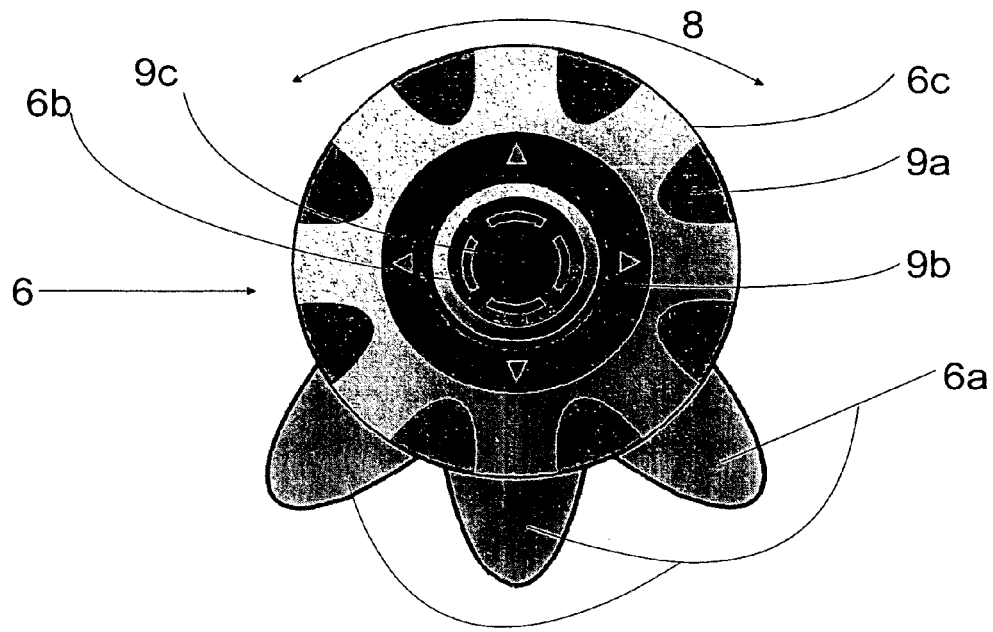
FIG. 3a illustrates a device according to a first preferred embodiment of the invention presented in a first operating mode.
Figure 3B:
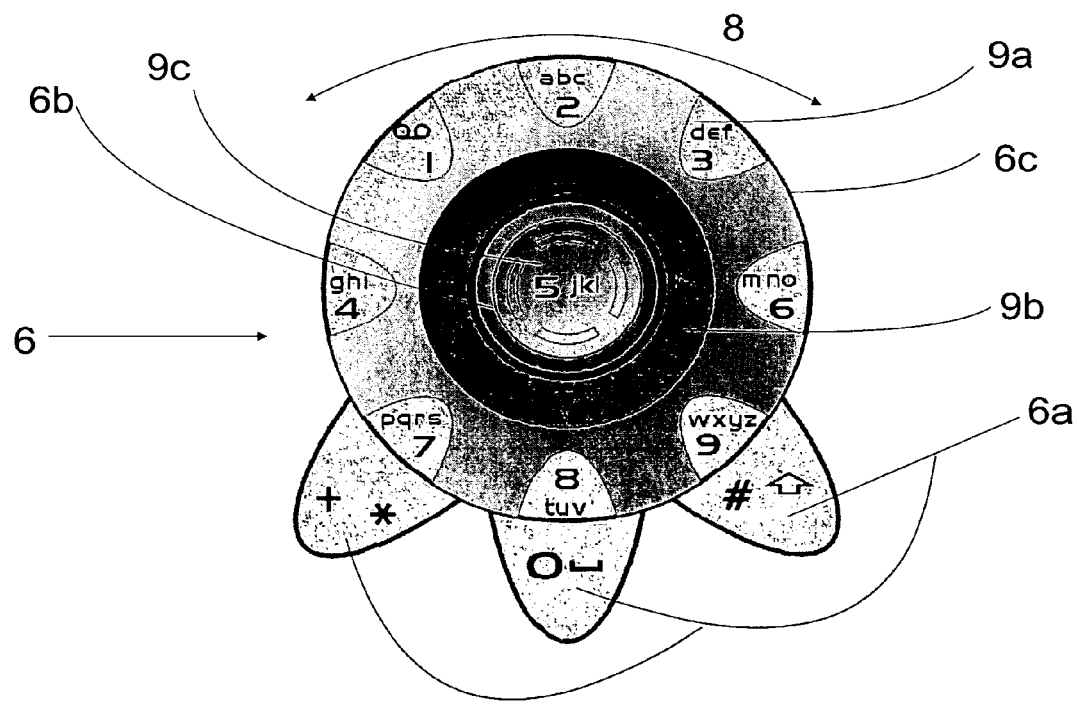
FIG. 3b illustrates a device according to a first preferred embodiment of the invention presented in a second operating mode.

The control element 6 also comprises a roller element 6c rotating in the plane of the cover part; the roller element may be used for presenting information about the operating mode of the control element 6 (navigation/alphanumeric) to the user. If the control element 6 is in the navigation mode, the display parts 9a on the outer surface of the roller element 6c can be used for presenting the different navigation directions, for example eight directions, so that it will be easier for the user to activate the control component 6b correctly. The display parts 9b on the inner perimeter of the roller element 6c can also be used for presenting navigation information to the user, as illustrated in FIG. 3a. The roller element 6c can also be used by the user for activating the different modes; in this case, the roller element 6c operates as a switch when it is rotated in a plane-like manner against the cover part in the direction pointed by arrow 8, conveying a control signal about the mode change to the control unit of the electronic device. If the control element is in the alphanumeric mode, the alphanumeric characters corresponding to said positions will be presented to the user on the outer surface of the roller element 6c, as illustrated in FIG. 3b. The distribution of the characters is preferably based on the established key pattern of a mobile phone, where the keypad is implemented in rows of three keys and a number also typically corresponds to a specific control function or an alphanumeric character. A possible correspondence mapping is the following:

| Number key: | Alphanumeric character: |
|---|---|
| 1 | voicemail service |
| 2 | abc |
| 3 | def |
| 4 | ghi |
| 5 | jkl |
| 6 | mno |
| 7 | pqrs |
| 8 | tuv |
| 9 | wxyz | as illustrated in FIG. 3b.

The roller element 6c also comprises bearing parts (not shown in the figure) for mounting the roller element 6c in the cover part 2 so that the roller element 6c is arranged to move in relation to the cover part 2, and sensor parts (not shown in the figure) for detecting the movement of the roller element 6c and conveying a control signal corresponding to the movement, most suitably an electric signal, to the device 1. It is obvious that in the alternative illustrated in FIG. 2, the control element 6 may also be located in the device 1 on any other surface of the outer cover 2, for example on the back cover or side cover of the device, providing more space in the front cover for larger display means 5.

FIG. 3a illustrates a multi-purpose control element 6 according to a preferred embodiment of the invention presented in a first operating mode. In this case, the operating mode is the navigation mode, which is activated from the alphanumeric mode by rotating the roller element 6c of the control element 6 clockwise or counter-clockwise in the direction of the arrow 8. The bearing parts (not shown in the figure) between the roller element 6c and the cover part 2 can be implemented so that when rotating the roller element 6c, the user feels a step-type resistance and is able to better notice when the position of the roller element 6c changes by one step and the mode is changed. Typically a step of rotation in the roller element 6c corresponds to an approximate rotational angle of 22.5 degrees. The transition from the navigation mode to the alphanumeric mode is accomplished in a similar manner by rotating the roller element 6c in either direction. In a preferred embodiment of the invention, the roller element 6c includes information display parts 9a and 9b for presenting information related to the operating mode of the control element to the user in the different operating modes. In this embodiment, no information is shown on the display parts 9a located on the outer perimeter of the roller element 6c while in the navigation mode, but the display part 9b located on the inner perimeter shows the navigation directions (left, right, up, down). Based on the information shown, the user is able to press the appropriate part of the control component 6b depending on the navigation information he wants to convey to the device 1. Naturally, the invention is not restricted to four directions. More precise implementations can be realised by adding intermediate directions. The control element 6b also comprises an information display part 9c for presenting information related to the various navigation directions while in the navigation mode, as illustrated in FIG. 3a where curve-shaped navigation information elements are shown on the display part 9c in the locations corresponding to the four navigation directions shown on the display part 9b in order to facilitate navigation. A possible method of implementing the information display parts is the use of LEDs (Light Emitting Diodes), so that depending on the mode, LEDs with light patterns of a desired shape will be activated to the user through the parts 9a to 9c made of transparent surface material. Another alternative for implementation can be that parts of a desired shape made of transparent material are implemented in the roller element 6c or the control component 6b, and LEDs with no specific light patterns are activated below said elements 6b and 6c so that the information corresponding to the transparent opening will be conveyed to the user. A third possible method of implementation is to entirely cover the desired elements, such as the roller element 6c and the control component 6b, with display material so that the surfaces of the elements will operate as small display elements and can be used for presenting the desired information to the user depending on the mode. The keys 6a illustrated in FIG. 3a are not required for actual selection of direction, but they can be used for providing added value to navigation, for example by means of a mouse activation function known from computers. Different functions can be defined for the different keys either by the user or the application. In a possible embodiment of the invention the rotation of the roller element 6c can be restricted to two distinct positions, and a tab covering the keypad part 6a can be formed in the lower part of the roller element 6c so that when the device 1 is in the navigation mode, the tab covers the keypad part 6a blocking access to it, and when the device 1 is in the alphanumeric mode, the tab moves away from the keypad part 6a, allowing the user to access the keys.

In the embodiment according to FIG. 3b, in the alphanumeric mode, the user has changed the mode by rotating the roller element 6c in either of the directions pointed by the arrow 8. As a consequence of this, the sensor means 18 monitoring the position of the roller element, illustrated later in FIG. 6, will convey information about the mode change to the device 1. The sensor means 18 will be discussed later in connection with FIG. 6. After the alphanumeric mode has activated, the information display parts 9a on the outer perimeter of the roller element 6c show the figures "1–4" and "6–9", as well as the letters and special characters under the figures, as illustrated in FIG. 3*b*. The figure '5' is presented using the display part 9*c* in the control component 6*b*. The figure '0', the characters '*' and '#', as well as a number of other special characters, will be located in the keys corresponding to the characters in the keypad part 6*a*, and the corresponding information is presented to the user by means of LEDs below the transparent surface of the keypad part 6*a* in a corresponding manner as described above for parts 9*a* to 9*c*. In the alphanumeric mode, numbers and/or characters are entered by pressing the pivoting control component 6*b* logically at the position on the outer perimeter of the control component 6*b* corresponding to the desired number or character information shown on the outer perimeter of the roller element 6*c*. The figure '5' and the characters corresponding to it are entered by pressing the control component 6*b* essentially at the middle. In addition to activating the display part 9*a* on the outer perimeter of the roller element, the alphanumeric part of the display part 9*c* on the control component 6*b* will be activated and the navigation part will be deactivated. In this embodiment, the figure '5' and the characters "jkl" will appear on the display part 9*c*, and the curve-shaped navigation information elements visible in the navigation mode will disappear from the view. The navigation directions shown on the display part 9*b* on the inner perimeter of the roller element will be deactivated similarly. In a possible embodiment of the invention, information can be presented to the user by means of LCD display structures instead of LEDs.

In an alternative embodiment of the invention, instead of pressing the pivoting control component 6*b*, the user will press the roller element 6*c*; the sensor means 18 monitoring the position of the roller element 6*c* are also arranged to convey information about the location of pressure. The user will press the roller element 6*c* logically at the position corresponding to the desired navigation direction, number or character information shown on the roller element 6*c*.

Figure 4A:
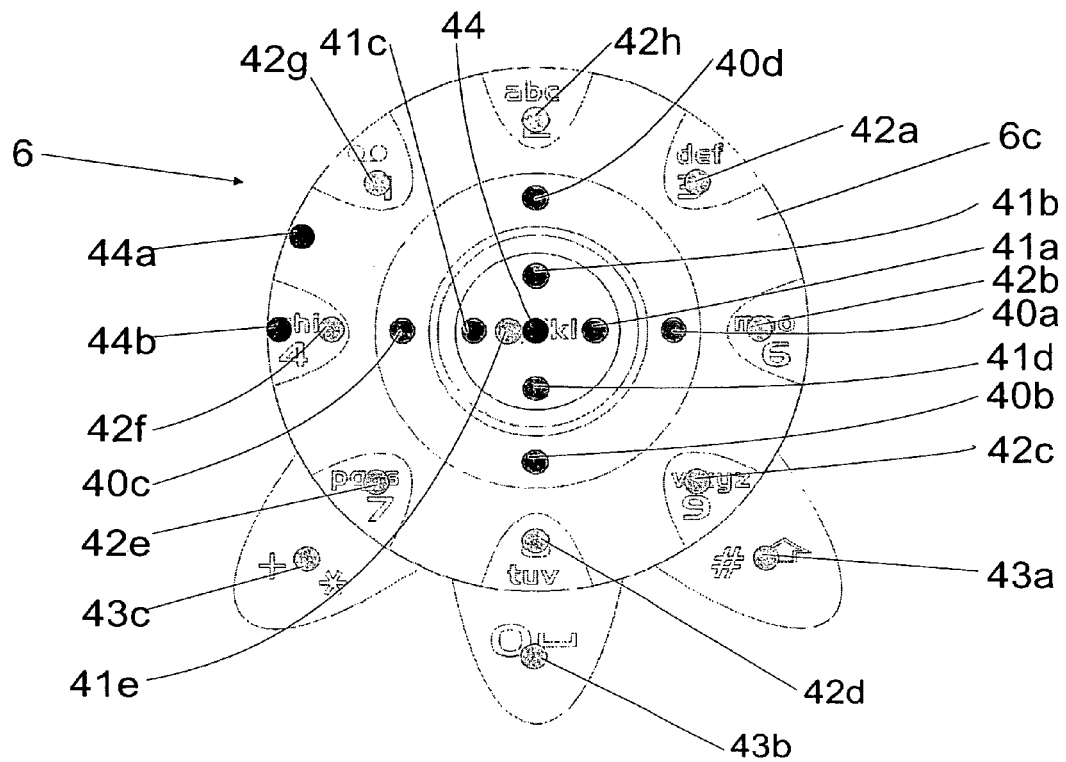
FIG. 4a illustrates the simplified structure of a control element according to a first preferred embodiment of an invention applied to the device viewed from the top.

FIG. 4*a* illustrates the simplified structure of a control element 6 according to a first preferred embodiment of an invention applied to the device viewed from the top. The detailed structure of the bearing parts is known as such to the skilled person, for example from the prior art control roller solutions mentioned above, so it is not necessary to describe their operation in more detail in this context. The structure of the sensor parts is discussed later in connection with FIGS. 4*b* and 5. Depending on the operating mode, information related to the mode is presented to the user, and in the embodiment illustrated in FIG. 4*a*, LEDs are used for presenting the information. The visibility of various information elements on the control element 6 can be controlled by activating the LEDs. When the roller element 6*c* is rotated to the position illustrated in FIG. 4*a*, the device is considered to be in the alphanumeric mode, and the LEDs 42*a–h* on the outer perimeter of the roller element 6*c*, the LED 41*e* on the control component and the LEDs 43*a–c* on the keypad part will be activated. When the roller element 6*c* is rotated so that the device changes to the navigation mode, said LEDs 42*a–h*, 41*e* and 43*a–c* pertaining to the alphanumeric mode will be deactivated (turned off), and the LEDs 40*a–d* and 41*a–d* required in the navigation mode will be activated (turned on). The figure also illustrates the joystick element 44 located below the control component 6*b* when viewed from the top. The joystick element is used for sensing the movement of the control component. Because of the joystick element 44, the LED 41*e* in the control component 6*b* is located slightly off-centre on the control component 6*b*. In FIG. 4*a*, to make the placement of the LEDs more clear, the LEDs are shown as if they were located on the surface of the control element 6, even though they are actually located below the control element 6 and only the light pattern activated by the LEDs is shown to the user. FIG. 4*a* also illustrates the elements 44*a–b* that provide information about the the position of the roller element 6*c*; in an embodiment of the invention, these elements are light-sensitive LEDs. When the roller element 6*c*, which is opaque to light, covers the light-sensitive LED 44*a*, as illustrated in FIG. 4*a*, the LED 44*a* will convey a control signal corresponding to the "closed" state to the device. When the light-sensitive LED is not covered by the roller element 6*c*, as is the case with LED 44*b* in FIG. 4*a*, the LED 44*b* will convey a control signal corresponding to the "open" state to the device. On the basis of these "closed/open" control signals, the control unit of the device is able to change the state information presented to the user. The position of the roller element 6*c* may also be determined by means of one light-sensitive LED, but the state can be determined more reliably using two LEDs. Other possible implementations for determining the position include a mechanical switch structure (not shown in the figure) for determining the mode selected by the user.

According to the invention, a separate button for additional functions may be arranged at the centre of the control component 6*b* in the control element 6. In the navigation mode, said button may function as an activation button for activating a specific function or moving forward/backward in the menu structure. According to the invention, in the alphanumeric mode, said button may function as the number key '5'.

Figure 4B:
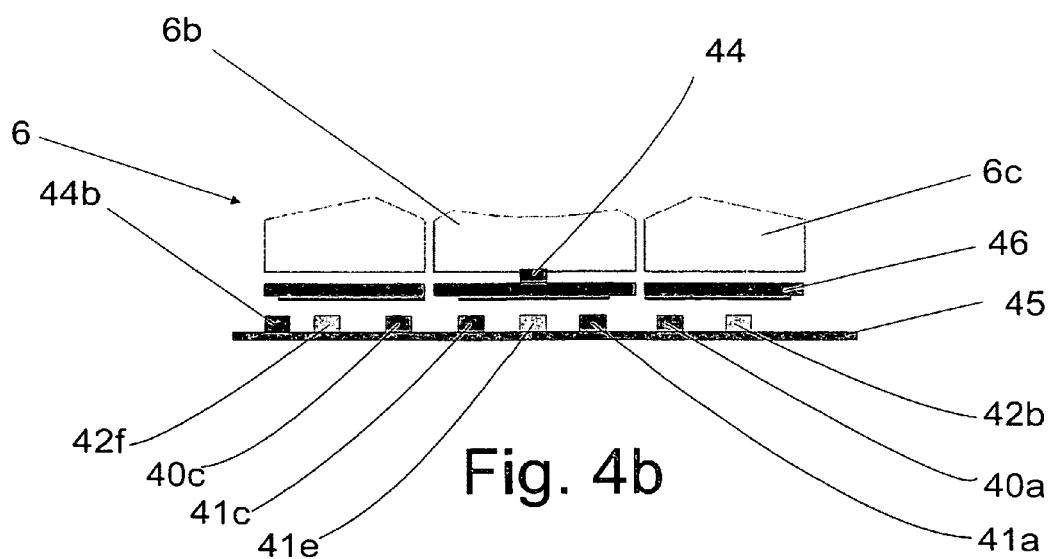
FIG. 4b illustrates the simplified structure of a control element according to a first preferred embodiment of an invention applied to the device as a cross section viewed from the side.

FIG. 4*b* illustrates the simplified structure of a control element 6 according to a first preferred embodiment of an invention applied to the device viewed from the side. The LEDs 40*a–d*, 41*a–d*, 42*a–h* and 43*a–c* (not shown in the figure) are installed on the printed circuit board 45 of the device. Said LEDs are activated on the basis of control signals from light-sensitive LEDs 44*a–b* determining the position of the roller element 6*c*. The layer 46 generating the light pattern seen by the user is located above the LEDs. The layer contains character patterns made of transparent material, by means of which the light from the LEDs below will reflect the desired character to the user. An alternative implementation is to use transparent material for other parts of the layer 46 and opaque material for the character patterns only. The display parts 9*a–c* discussed above in connection with FIGS. 3*a* and 3*b* are formed from the layer 46. In an embodiment of the invention, the movements of the control component 6*b* in the various operating modes are sensed using the joystick element 44. The joystick is fastened to the control component 6*b* and will convert the user's activation of the control component 6*b* in a specific direction into an electric control signal that will be conveyed to the control unit of the device. The joystick element 44 is able to differentiate between the eight directions required by the invention and a button press function corresponding to the figure '5' in the alphanumeric mode, for example. As illustrated in FIG. 4*b*, the joystick element 44 may be located in the layer 46 or on the printed circuit board 45 of the device. As the element is known as such from prior art, it is not necessary to describe it in any more detail in this context.

Figure 5:
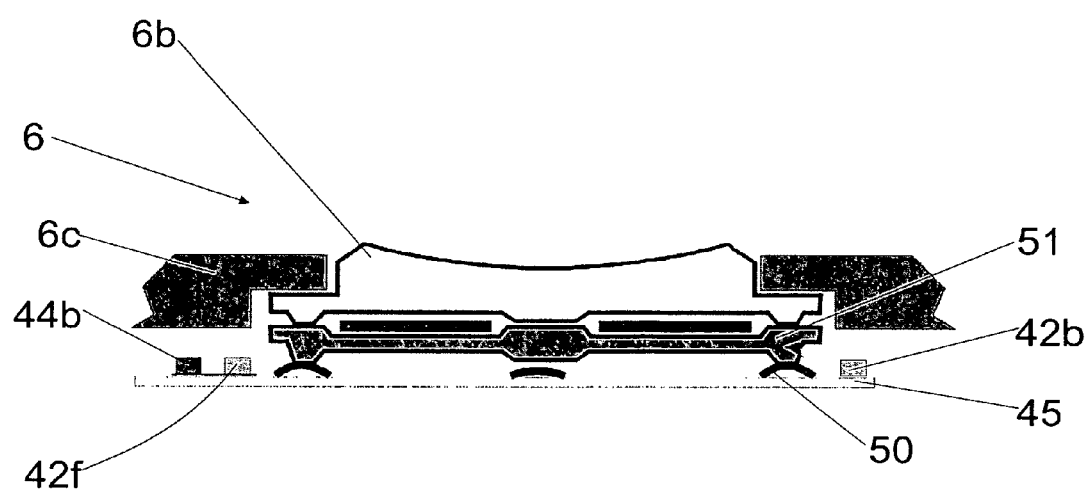
FIG. 5 illustrates the simplified structure of a control element according to a second preferred embodiment of an invention applied to the device as a cross section viewed from the side.

FIG. 5 illustrates the simplified structure of a control element 6 according to a second preferred embodiment of an invention applied to the device viewed from the side. In this embodiment, pressure on the control component 6*b* is sensed using the key membrane 51 and the key caps 50 instead of using the joystick structure described above. Key caps 45 corresponding to the activation spots of the control component 6b are implemented on the printed circuit board 45 of the device. When the user presses the control component 6b at the figure '6', for example, the key membrane 51 below the control component 51 conveys the pressure to the key cap 50; as the key cap moves down, it makes an electrical contact with a switch element on the surface of the printed circuit board 45, and information about the user's pressing action is conveyed to the control unit of the device. A similar implementation may be constructed using either the key membrane 51 or the key caps 50 only; in the former case, the surface of the key membrane 51 contacting the printed circuit board 45 will make an electrical contact as such, and in the latter case, the bottom surface of the control component 6b will directly press the key cap 50, causing an electrical contact. The number of key caps in the implementation may be reduced by placing the key caps 50 only at the figures '5', '2', '6', '8' and '4' and reading the rest of the numbers as combinations of these, that is, simultaneous activation of two key caps 50; for example, when the figures '6' and '8' are pressed simultaneously, the control unit of the device will get the information that the user has pressed the figure '9'. Also in this embodiment, LEDs can be used for determining the position of the roller element 6c, illuminating the control element 6 and presenting keypad information, just as shown in the examples of FIGS. 4a–b. FIG. 5 illustrates possible locations for the light-sensitive LED 44b and two LEDs 42f and 42b for showing keypad information.

Figure 6:
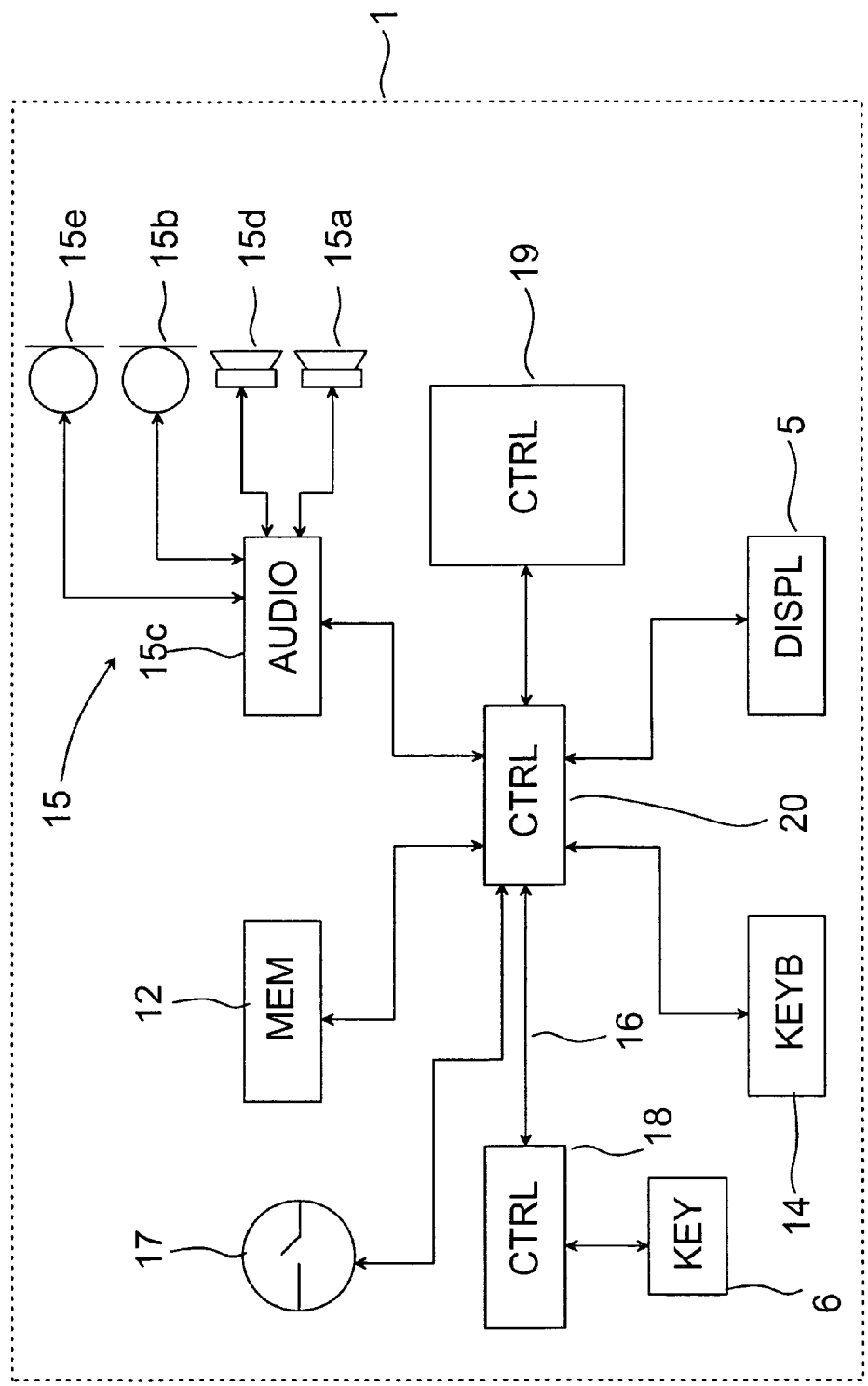
FIG. 6 illustrates a principal diagram of the functional blocks in a device according to a preferred embodiment of the invention.

FIG. 6 shows a simplified block diagram of the control means 12–20 of a wireless communications device according to a preferred embodiment of the invention. The wireless communications device 1 comprises, among other components, a control unit 20, memory means 12, display means 5 and input means 14. The input means 14 correspond, for example, to the other keys implemented in the wireless communications device 1 in addition to the control element 6. The block diagram also shows audio means 15, such as an earphone 15a and a microphone 15b, as well as an audio block 15c for analog-to-digital conversion of the microphone signal and digital-to-analog conversion of the signal to the earphone 15a, for example. The audio means 15 may comprise an additional earphone 15d and an additional microphone 15e, for example for use with different cover parts of the device 1. The memory means 7 comprise RAM (Random Access Memory) particularly for storing information required during operation of the device 1, as well as ROM (Read-Only Memory) particularly for storing programs.

The control unit 20 comprises, for example, a MCU (Microcontroller Unit) and a programmable logic circuit (ASIC, Application Specific Integrated Circuit), and it is also connected to control blocks 19 or similar blocks controlling other functions of the wireless communications device 1, such as the reception and transmission functions, I/O functions and RF sections of the device 1.

The control unit 20 is also connected to the control element 6, particularly to its sensor means 18, which provide the control unit 20 with the control signal 16. With reference to FIG. 4b, the sensor means 18 in a control element 6 according to the invention comprise the means for sensing user activation of the control component 6b, such as the joystick element 44. The joystick is fastened to the control component 6b and will convert the user's activation of the control component 6b in a specific direction into an electric control signal. With reference to FIG. 5, the sensor means 18 may alternatively comprise the key membrane 51 and/or the key caps 50. With further reference to FIGS. 4a–b and FIG. 5, the sensor means 18 in a control element 6 according to the invention also comprise the light-sensitive LEDs 44a and 44b that sense the movement of the roller element 6c and convert it to an electric control signal 16. The sensor means of the roller element 6c may alternatively comprise a roller that is pressed against the roller element 6c and rotates under control of the roller element 6c by means of friction (not shown in the previous figures). The control signal 16 preferably comprises information about the activation of the keypad part 6a, control component 6b or roller element 6c in the control element 6, for example. The device 1 using the invention may also comprise moving cover parts such as a sliding cover structure, a flap-type structure folding over a hinge or a two-part communicator-type device structure (such as the Nokia 9210 Communicator). In these implementation environments, the device 1 may comprise a separate switch element 17 for conveying information about the position of said moving cover structure to the control unit 20. If the control element 6 according to the invention is located, for example, in the CMT (Cellular Mobile Telephone) user interface on the outer cover surface of an openable communicator-type device, the control element 6 can be deactivated on the basis of a signal from the switch element 17 when the device is in the open position and the PDA (Personal Digital Assistant) user interface is used, or some alternative functions for use in the closed position of the device may be defined for the control element 6.

The invention may also be utilised for controlling several functions of the device 1 using different operation sequences of the control element 6. At the same time, the display part 5 may show the effect of the operation sequences and the state of the device 1. A key press refers to either a press on a key located in the centre of the control component 6b, a press on the entire control component 6b, or a press on a key in the keypad part 6a. A possible implementation of a key press according to the invention is that in addition to rotation, the key press effect is taken into account in the implementation of the roller element 6c. In this case, the user can generate key press/rotation sequences using the roller element only. Operation sequences for controlling the device 1 include, for example, a sequence comprising a long key press that will switch the device on ("Power On" state) or off ("Power Off" state), or as the phone is ringing, a sequence of movement to the additional position, clockwise rotation and counter-clockwise rotation for answering the call ("Send" state), or as the phone is ringing or a call is in progress, a sequence of movement to the additional position and clockwise rotation for ending the call ("End" state), or in the normal state of the device 1, a sequence of movement to the additional position and clockwise rotation for locking the keypad, a sequence of movement to the additional position, counter-clockwise rotation and clockwise rotation for switching to the "Menu" state, or a sequence of movement to the additional position and clockwise rotation for switching from the "Menu" state to the normal state (and for going back in the menu structure). A PIN code (Personal Identification Number) can be entered into the device 1 by rotating and selecting the numbers by a key press, or in alphanumeric mode by pressing particular points of the control component, but also in a manner where the PIN code constitutes a specific operation sequence. Preferably the operation sequences can be defined by the user and stored in the device 1, for example using a separate function.

As described above, the device 1 contains one or more operation sequences comprising at least one movement of the roller element 6c and at least one other movement of the control element 6 essentially following in immediate sequence. An example of an operation sequence is clockwise rotation followed by counter-clockwise rotation. To facilitate the generation of sequences, the roller element 6c may be implemented so that it will automatically return to its normal position, for example by spring action, when the roller element 6c is not touched. The movements follow each other in essentially immediate sequence. Timers in the control unit of the device 1 and preset time limits are used for monitoring the performance of the sequences. The use of a spring-operated roller element 6c for selecting the operating modes (alphanumeric/navigation) may be implemented so that the control unit 20 of the device 1 will monitor the control signal from the sensor means 18, such as the light-sensitive LEDs 44a–b, sensing the position of the roller element 6c, and will change the operating mode in accordance with the control signal even though the spring Will always return the roller element 6c to its normal state.

According to a preferred embodiment of the invention, the control element 6 is operated so that by holding a key in the keypad part 6a or the control component 6b in the down position, that is, the moved position, and simultaneously rotating the roller element 6c from its normal position, the menu structure of the device 1 can be navigated down and up. Hereinafter, said key press on the keypad part 6a or the control component 6b in the context of sequence generation or menu structure navigation is referred to as a sequence key press. In this description, releasing refers particularly to returning the control element 6 to its normal position. The use of the control element 6 can be simplified and the number of operating errors can be reduced by arranging the roller element 6c to be automatically releasing, for example by means of spring action.

The device 1 may be switched on by holding the control component 6b in the down position so that the device 1 switches into a state where the switching on can be confirmed. After this, the device 1 switches into a state where information constituting the basic menu functions and, as additional information, the identifier of the telephone network provider is shown on the display. In order to browse and select the menu functions, the sequence key press is held active. The cursor on the display 5 will activate and show the current menu function by means of highlighting, for example. When the sequence key press is held active, the cursor will move from a menu function to another by rotating the roller element 6c and will show the available menu functions.

By selecting the "Menu" function by releasing the roller element 6c while the cursor is at the appropriate menu function, the display 5 will next show information comprising both basic level menu functions and a menu function on the next level, such as the "Phone Settings" menu function. The basic level menu functions can now be accessed by making a sequence key press and holding it active, which will return the device to the initial state or show the basic level menu functions on the display in addition to the "Phone Settings" menu function. According to the invention, the menu structure may alternatively be navigated backwards by holding the sequence key press active and rotating the roller element 6c, which may change the "Ringing Volume" menu function, for example, first to the "Phone Settings" menu function and further to the basic level. In addition, by rotating the roller element in the additional position, the menu structure may be navigated forward, returning on the route used for the "Ringing Volume" menu function; the route is also stored in the memory of the device. The route may be navigated backwards and forwards by means of a single control element 6 and a single grip on the device. Naturally, the navigation back to a higher level may only be arranged up to the menu function previously reached by making selections on the route.

If the user wants to move to another menu function on the route, the "Backlights on/off" menu function can be accessed in the previous case by navigating to the "Phone Settings" menu function by means of rotation in the additional position and by releasing the control element 6. After this, the "Ringing Volume" and "Backlights on/off" menu functions can be browsed on the display by means of rotation, and the "Backlights on/off" menu function can be selected by means of a sequence key press. After this, the display may show the alternatives "ON" and "OFF", with a flashing cursor, for example, indicating the current selection.

The period of time used for holding the sequence key press active may also be used for differentiating between functions of the device 1; in this case, for example when the key is pressed, the device 1 will wait for rotation for a moment and only after a preset period of time will automatically return to the basic level. This allows the user to indicate the desired function to the device 1 by means of the duration of the key press or the duration of the key press before rotation. The control unit 20 of the device 1 will monitor the delays in the actions and the operation sequences of the control elements by means of timers, for example. On the basis of the signal 16 received from the sensor means 18, a control program operating under the control unit 20 will control the display part in order to present information. Information about the states, menu structure and menu functions of the device 1 is stored in the device 1, and on the basis of control signals received from the control element 6, the control program will select the information to be presented and will control the other operations of the device.

If the user wants to switch the device 1 off, the appropriate menu function can be accessed as described in the following. While holding the sequence key press active, the roller element 6c is rotated to access the "Backlights on/off" menu function. The return will also indicate to the control unit of the device 1 that the function is cancelled. The roller element may be rotated clockwise or counter-clockwise. The desired menu function can be accessed by continuing to hold the sequence key press and rotating the roller element. The horizontal level with the "Phone Settings" menu function is selected by releasing the control element 6. The menu functions on this level may now be browsed by rotating the roller element, and the desired "Power Off(/On)" menu function can be selected by clicking the control component 6b. The device 1 may request confirmation for the power off function, which may also be confirmed by clicking.

The following is a more detailed description of using the control element 6 in a mode of the device 1 used for forming a string of alphanumeric characters. The control element of the device illustrated in FIG. 2 is switched to the alphanumeric entry mode by rotating the roller element 6c. A possible method of implementing the mode is that when the roller element 6c is rotated once either clockwise or counter-clockwise, the operating mode of the device will change from the navigation mode to the "123" submode of the alphanumeric entry mode, where the user can enter numbers from 1 to 9 using the control component 6b. Another rotation of the roller element in the same direction will switch the device to the "abc" mode where the user can enter lowercase letters from a to z using the control component 6b. A third rotation of the roller element 6c will switch the device back to the "123" mode, and a fourth rotation of the roller element 6c in the same direction will switch the device to the "ABC" mode where the user can enter uppercase letters from A to Z using the control component 6*b*. Naturally, the invention may also be applied to other operating modes of the device, and the sequence for switching from one mode to another is not restricted to those described above but may vary within the scope of the independent claims.

In the following, the locking functions of the device 1 will be examined. While the device 1 is locked, the display may show information pertaining to the locked state. In this state, the keypad part 6*a* or the other control element 6 cannot be used, and only a select set of functions is available in the device 1. The device can be locked by browsing to the appropriate menu function and selecting it. Another alternative for activating the locking function according to the invention is to define a specific control element sequence which may include the use of the various parts of the control element 6, the keypad part 6*a*, the control component 6*b* and the roller element 6*c*. A possible sequence might be one clockwise rotation followed by one counter-clockwise rotation of the roller element and a press on the control component within a set time limit, for example 3 seconds. The lock can be opened, for example, by means of a similar sequence using the various parts of the control element 6, or the appropriate unlock function can be accessed in the menu of the device using the control element 6.

While the lock is activated, an incoming call may automatically initiate a mode where the "Answer" menu function for answering the call or the "Hangup" menu function can be selected. Browsing of the functions may be implemented by rotating the roller element 6*c* or pressing the control component 6*b*, and the desired function may be selected either by pressing the control component 6*b* or the keypad part 6*a*. During a call in progress, the volume of the speaker 15*d* or 15*a* in the device 1 may be adjusted by rotating the roller element 6*c* or pressing the control component 6*b* of the control element 6, and the call may be terminated by clicking the control component 6*b* or the keypad part 6*a*.

The present invention has several advantages in comparison with prior art implementations. The invention can be applied, for example, to mobile phones, palmtop computers and small laptop computers. Alternatively, it can be used in electronic games and the user interfaces of home and office electronic devices such as hifi equipment or car stereos, as well as in multimedia devices used on aircraft, for example.

This paper presents the implementation and embodiments of the present invention with the help of examples. It will be appreciated by the skilled person that various modifications may be made to the embodiments described above without departing from the scope of the present invention. The embodiments presented should be considered illustrative, but not restricting. Thus, the possibilities of implementing and using the invention are only restricted by the enclosed claims. Consequently, the various options of realising the invention as determined by the claims, including the equivalent realisations, also belong to the scope of the invention.

The invention claimed is:

1. An electronic device comprising:
a protective cover;
a control element mounted at a specified place on the protective cover, the control element configured to receive input, the control element comprising at least a first input means and a second input means, the first input means comprising a multi-function input means and the second input means comprising an essentially a ring-shaped input means rotatable in a plane.
where said control element has a first input mode and a second input mode; wherein when in the first input mode, the control element is arranged to provide the electronic device with navigation information in response to at least one of the following actions:
operation of the first input means; or
operation of the second input means; and
when in the second input mode, the first and second input means are configured to display alphanumeric information, particular alphanumeric information being associated with, and displayed by, each of the first input means and particular locations of the second input means, and the control element is arranged to provide the electronic device with particular alphanumeric information in the second input mode in response to at least one of the following actions:
a press on the first input means if the particular alphanumeric information is associated with the first input means; or
a press on a particular location of the second input means out of several possible press locations, if the particular alphanumeric information is associated with that particular location.

2. An electronic device according to claim 1, wherein
in the first input mode, the control element is arranged to provide the electronic device with navigation information in response to at least one of the following actions:
a press on a particular location of the first input means out of several possible press locations,
a press on a particular location of the second input means out of several possible press locations
wherein the control element is configured to perform a particular navigation function in response to the press on a particular location.

3. An electronic device according to claim 1, wherein
in the first input mode, the control element is arranged to perform a particular navigation function in response to
either holding the second ring-shaped input means pressed and selecting either a clockwise or counter-clockwise direction or scrolling the second ring-shaped input means towards either a clockwise or counter-clockwise direction, and
releasing the second ring-shaped input means.

4. An electronic device according to claim 1, wherein
in addition, the control element comprises a third input means formed of one or more keys.

5. An electronic device according to claim 1, wherein
the first input means is arranged to receive input information from a user, and
the second input means is arranged to receive mode switch information from the user for switching between the first and second input modes.

6. An electronic device according to claim 4,
wherein the third input means is arranged to receive input information from a user, and
the second input means is arranged to receive mode switch information from the user for switching between the first and the second input modes.

7. An electronic device according to claim 1, wherein
the first, multi-function, input means is arranged to receive presses, touches or movements from the user.

8. An electronic device according to claim 4, wherein
the first input means is located on the protective cover of the electronic device inside the ring-shaped second input means, and the third input means is located on the protective cover of the electronic device below the second input means.

9. An electronic device according to claim 1, wherein
the control element comprises means for presenting information about the input mode to the user.

10. An electronic device according to claim 1, wherein
said means are arranged to display information, and
in the first mode, the information displayed by said means comprises navigation directions selectable by means of the control element.

11. An electronic device according to claim 1, wherein
the electronic device is arranged to be controlled using one or more operation sequences of the control element, the operation sequence consisting of a set of first movements and second movements essentially in immediate sequence.

12. An electronic device according to claim 11, wherein
said first movements are movements of the first, multi-function, input means, and
said second movements are movements of the second input means, rotatable in a plane.

13. A method comprising:
implementing a control element in an electronic device, the control element configured to enter input, the control element comprising at least a first input means and a second input means, the first input means comprising a multi-function input means and the second input means comprising an essentially ring-shaped input means, wherein the first input means is operable to be activated, and the second input means is operable to be rotated in a plane,
arranging the control element to operate in a first input mode where the electronic device configured to receive navigation information in response to at least one of the following actions:
operation of the first input means; or
operation of the second input means, and
arranging the control element to operate in a second input mode, wherein when in the second input mode the control element is configured to display alphanumeric information available for selection on the first and second input means, and where the electronic device is configured to receive alphanumeric information in response to at least one of the following actions:
operation of the first input means; or
operation of the second input means.

14. A control element for an electronic device, the electronic device mounting the control element on a protective cover, the control element comprising:
a first input means comprising a multi-function input means; a second input means the second input means comprising an essentially ring-shaped input means rotatable in a plane, where
said control element has a first input mode and a second input mode;
wherein when in the first input mode, the control element is arranged to receive input in the form of navigation information; and
when in the second input mode, the control element is arranged to receive input in the form of alphanumeric information, wherein when in the second input mode the alphanumeric information available for selection is displayed by the first and second input means.

* * * * *